(12) United States Patent
Verheyden

(10) Patent No.: US 10,598,867 B2
(45) Date of Patent: Mar. 24, 2020

(54) METHOD AND ARRANGEMENTS FOR STACKING ADAPTERS

(71) Applicant: COMMSCOPE CONNECTIVITY BELGIUM BVBA, Kessel-Lo (BE)

(72) Inventor: Danny Willy August Verheyden, Gelrode (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 15/775,809

(22) PCT Filed: Nov. 11, 2016

(86) PCT No.: PCT/EP2016/077500
§ 371 (c)(1),
(2) Date: May 11, 2018

(87) PCT Pub. No.: WO2017/081295
PCT Pub. Date: May 18, 2017

(65) Prior Publication Data
US 2018/0329152 A1     Nov. 15, 2018

Related U.S. Application Data

(60) Provisional application No. 62/255,002, filed on Nov. 13, 2015, provisional application No. 62/255,028, filed on Nov. 13, 2015.

(51) Int. Cl.
*G02B 6/38* (2006.01)
*G02B 6/44* (2006.01)

(52) U.S. Cl.
CPC ......... *G02B 6/3825* (2013.01); *G02B 6/3893* (2013.01); *G02B 6/3897* (2013.01); *G02B 6/4452* (2013.01); *G02B 6/4471* (2013.01)

(58) Field of Classification Search
CPC .. G02B 6/3825; G02B 6/3893; G02B 6/3897; G02B 6/4452; G02B 6/4471
(Continued)

(56) References Cited

U.S. PATENT DOCUMENTS

| | | | |
|---|---|---|---|
| 5,511,144 A | 4/1996 | Hawkins et al. | |
| 8,270,796 B2 * | 9/2012 | Nhep | G02B 6/3825 385/135 |

(Continued)

FOREIGN PATENT DOCUMENTS

| | | |
|---|---|---|
| EP | 2 899 577 A1 | 7/2015 |
| TW | M 508 684 U | 9/2015 |

(Continued)

OTHER PUBLICATIONS

International Search Report and Written Opinion of the International Searching Authority for corresponding International Patent Application No. PCT/EP2016/077500 dated Mar. 23, 2017, 12 pages.

*Primary Examiner* — Jerry M Blevins
(74) *Attorney, Agent, or Firm* — Merchant & Gould P.C.

(57) ABSTRACT

In one implementation, a connection system includes an adapter block assembly (130, 160) and methods for making thereof. In one aspect, the adapter block assembly (130, 160) includes a plurality of adapters (20), each of which having a slot structure (50). The adapter block assembly 130 can be built by providing a support structure (100) having a plurality of extension members (102) that engage with the adapter slot structures (50). In one implementation, a flange clip (200, 220) is removably inserted into the slot structure (50), wherein the flange clip (200, 220) has a second width (W3, W4) that is greater than first width (W1).

18 Claims, 20 Drawing Sheets

(58) Field of Classification Search
USPC .......................................................... 385/77
See application file for complete search history.

(56) References Cited

U.S. PATENT DOCUMENTS

2013/0108231 A1   5/2013   Mertesdorf
2016/0356966 A1   12/2016  Lin et al.

FOREIGN PATENT DOCUMENTS

| WO | 95/20175 A1    | 7/1995 |
| WO | 2009/040564 A1 | 4/2009 |
| WO | 2013/106183 A1 | 7/2013 |
| WO | 2017/081300 A1 | 5/2017 |
| WO | 2017/081306 A1 | 5/2017 |

* cited by examiner

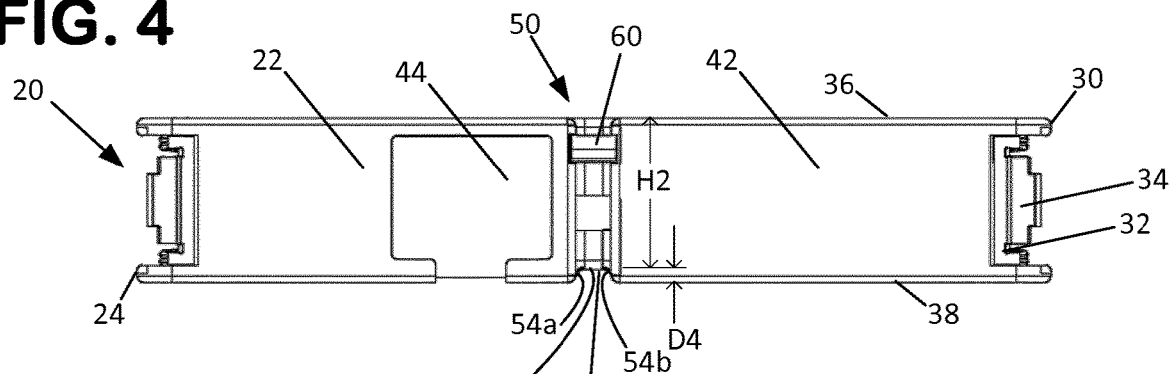
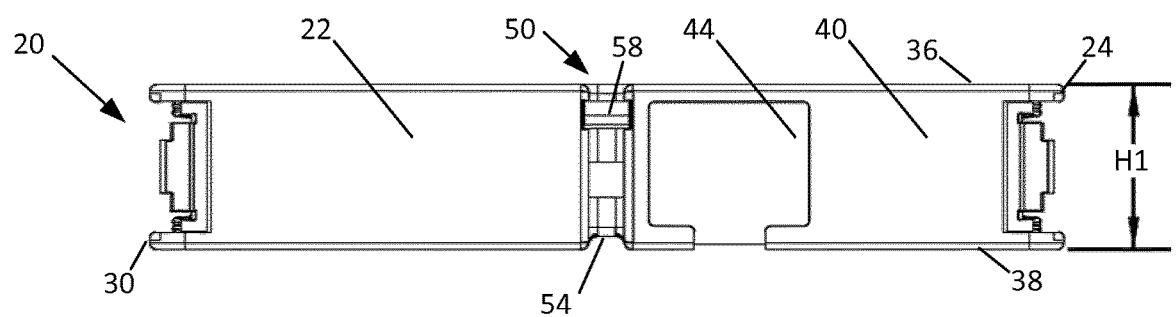
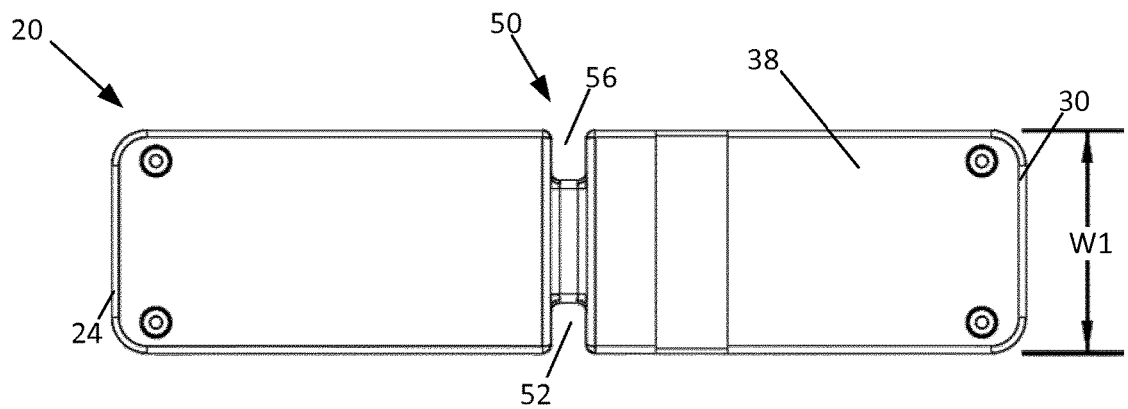
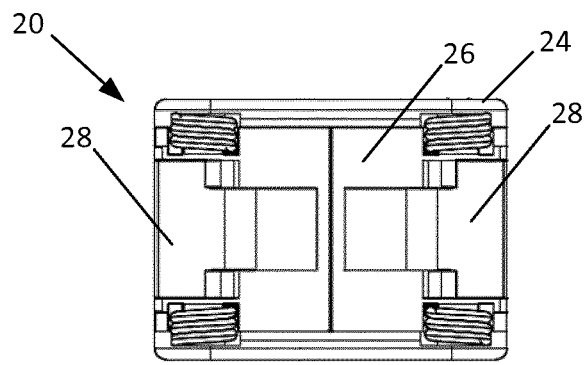

METHOD AND ARRANGEMENTS FOR STACKING ADAPTERS

This application is a National Stage Application of PCT/EP2016/077500, filed on Nov. 11, 2016, which claims the benefit of U.S. Patent Application Ser. No. 62/255,002, filed on Nov. 13, 2015, and claims the benefit of U.S. patent Application Ser. No. 62/255,028, filed on Nov. 13, 2015, the disclosures of which are incorporated herein by reference in their entireties. To the extent appropriate, a claim of priority is made to each of the above disclosed applications.

BACKGROUND

The present disclosure relates generally to fiber optic connection systems. Modern optical devices and optical communications systems widely use fiber optic cables. Fiber optic cables are often used to transmit light signals for high speed data transmission. A fiber optic cable typically includes an optical fiber or optical fibers, a buffer or buffers that surround the fiber or fibers, a strength layer that surrounds the buffer or buffers, and an outer jacket. The optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel, and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles for receiving the fiber optic connectors desired to be interconnected). The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. Some systems are known which include alignment of fibers but no ferrules.

Improvements in the area of fiber optic connection are desired.

SUMMARY

In one implementation, a fiber optic connection system includes a fiber optic adapter assembly. The fiber optic adapter assembly can include a plurality of adapters, each of which having a housing with opposing top and bottom sides defining a first height and with opposing first and second sidewalls defining a first width. The housing extends between a first end and a second end. The housing includes at least one port for receiving a fiber optic connector.

The housing also defines a slot structure, wherein the slot structure extends along at least one of the bottom side, the first sidewall, and the second sidewall. The housing slot structure can receive a variety of removable flange clips to suit different applications. The flange clip can have a width that is greater than the housing width. The housing can also include a recessed area for receiving a panel clip to aid in retaining the adapter on a panel.

In one configuration, an adapter block assembly can include a support structure for holding the plurality of adapters. The support structure can be configured to hold multiple rows of stacked adapters, wherein the support structure is received into the slot structures of the adapters.

In another configuration, the adapter block assembly can include a fixture for holding the plurality of adapters, wherein the fixture includes a plurality of extension members, at least some of which are received into the slot structures of the adapters. Connectors can be provided that snap-fit with each other and the extension members to facilitate vertical stacking of the adapters. The connectors have legs that are also received into the slot structure of the adapters.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE FIGURES

FIG. 4 is a first side view of the adapter shown in FIG. 1;

FIG. 5 is a second side view of the adapter shown in FIG. 1;

FIG. 6 is a bottom view of the adapter shown in FIG. 1;

FIG. 7 is a front view of the adapter shown in FIG. 1;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts. Additionally, any examples set forth in this specification are not intended to be limiting and merely set forth some of the many possible embodiments for the appended claims.

Figure 1:
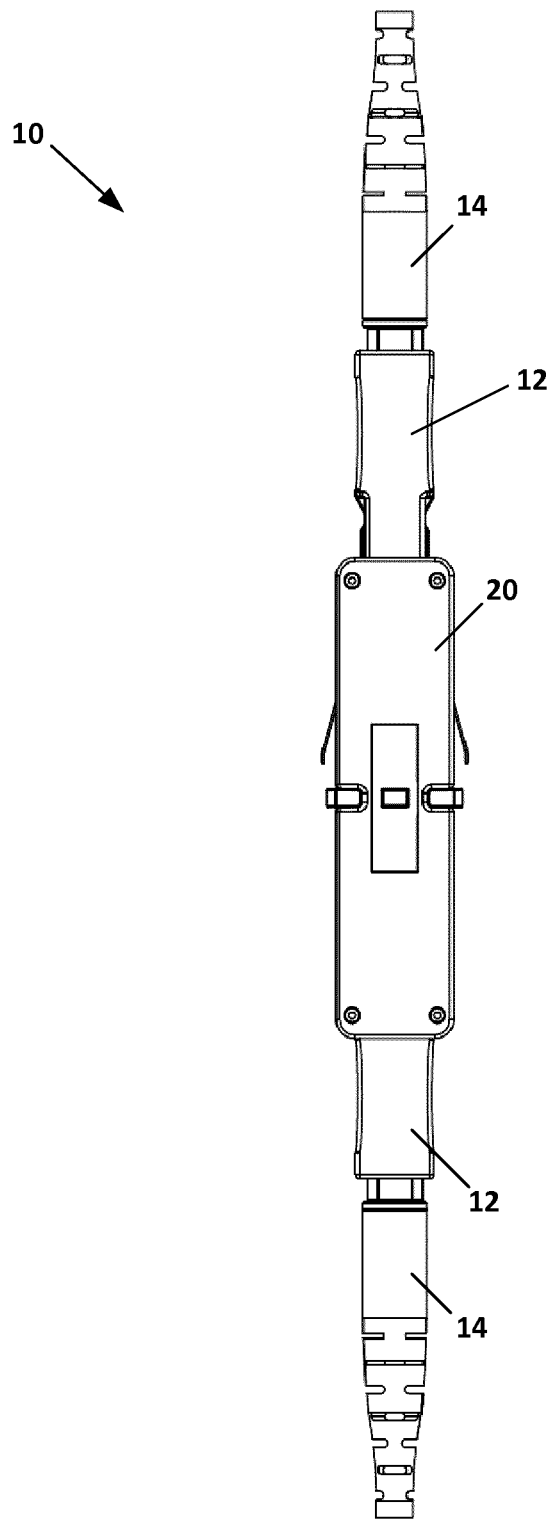
FIG. 1 is a top view of a fiber optic connection system having features that are examples of inventive aspects in accordance with the disclosure, the connection system including an adapter configured to fit within an SC footprint and a pair of male connectors to be mated therethrough, wherein one of the male connectors is shown as partially inserted within the adapter.
Figure 2:
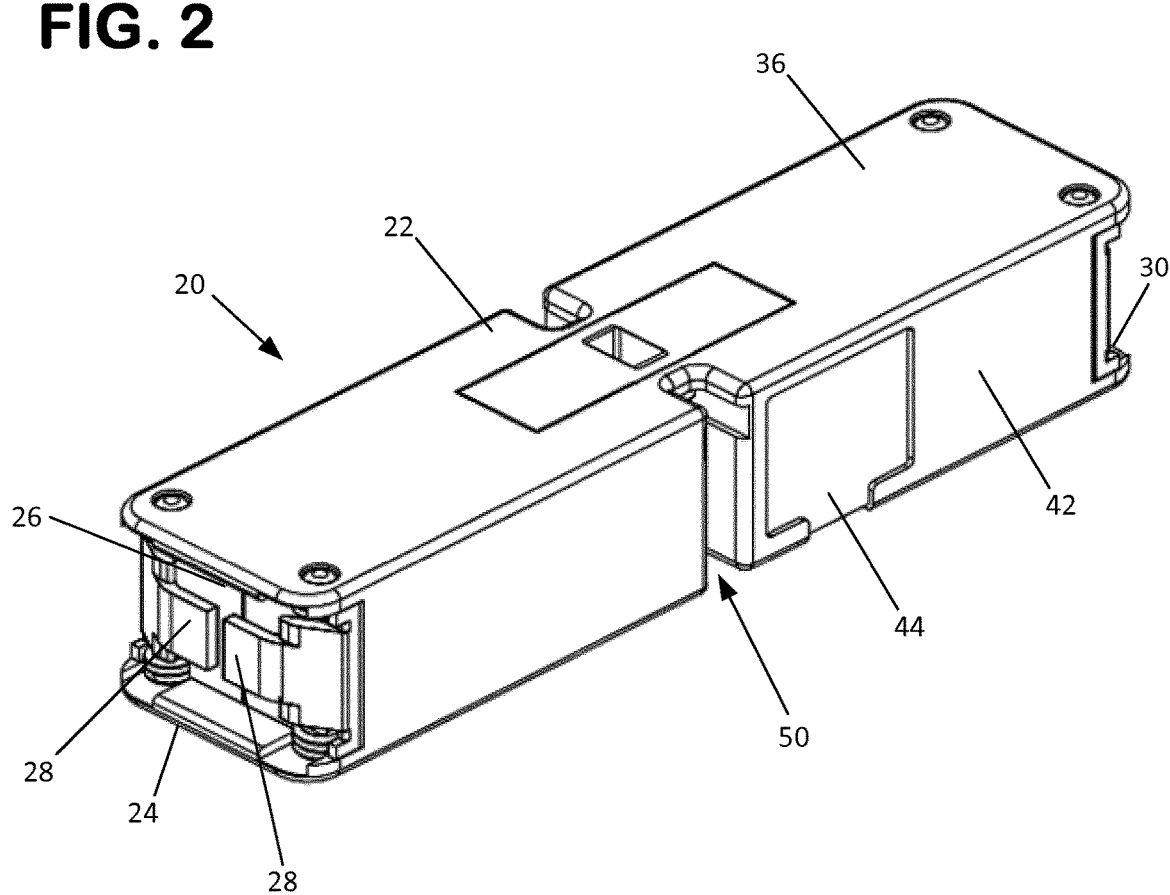
FIG. 2 is a perspective view of the adapter shown in FIG. 1.
Figure 3:
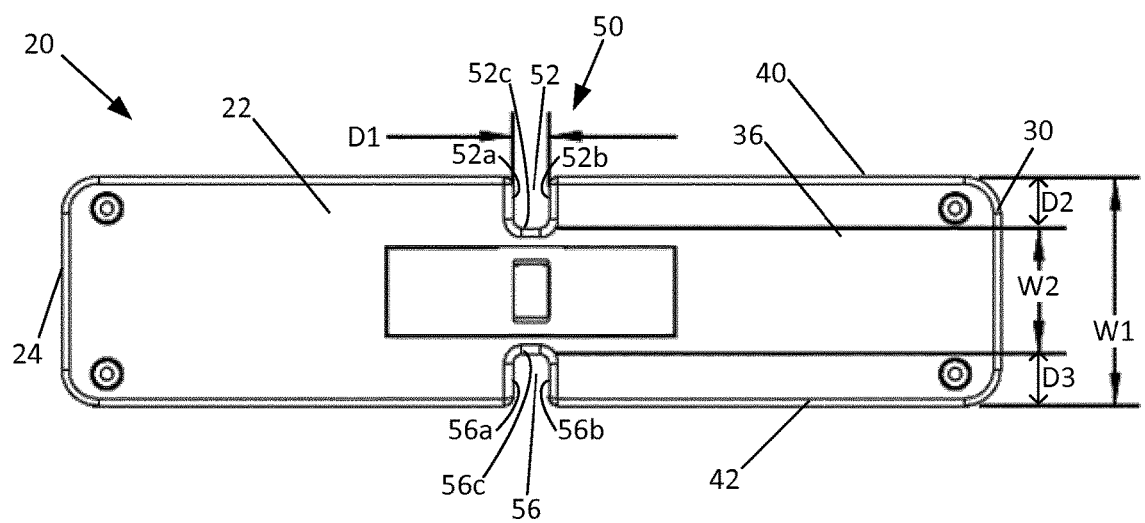
FIG. 3 is a top view of the adapter shown in FIG. 1.

Referring now to FIG. 1, a first embodiment of a fiber optic connection system 10 is shown. System 10 includes a first fiber optic connection component 12 (e.g., a male fiber optic connector) terminating a first fiber optic cable 14 and a second fiber optic connection component 12 (e.g., a second male fiber optic connector) terminating a second fiber optic cable 14. The male connectors 12 are configured to intermate for passing the fiber optic signal between the cables 14 through an intermediate fiber optic adapter 20 according to the features of the system 10.

In the depicted embodiments of the disclosure, the fiber optic connection system 10 is configured as a multi-fiber connection system that is configured to align a plurality of optical fibers carried by each cable. In the depicted embodiments of the disclosure, the multiple fibers can be generally aligned in a row, similar to that of a ribbonized fiber formation. The fiber optic connection systems 10 of the present disclosure may be configured to fit within conventional footprints provided in the telecommunications industry. It is noted that the concepts disclosed for the adapter 20 may be utilized with any type of adapter (e.g. SC, MPO, etc.) and other types of connector assemblies, such as copper jack/plug assemblies and standard fiber optic connectors.

Further details relating to the system 10, including adapter 20, are described in U.S. Provisional Patent Application Ser. No. 62/255,171, and incorporated herein by reference in its entirety; and U.S. Provisional Patent Application Ser. No. 62/254,867 and incorporated herein by reference in its entirety.

Adapter 20

With reference to FIGS. 2-7, the adapter 20 is shown in further detail. As shown, the adapter has a housing 22 extending between a first end 24 and a second 30. At the first end 24, a connector port 26 for receiving the fiber optic connector 12 is provided. The connector port 26 is accessible only through a pair of spring loaded shutters 28 that are designed to be opened by insertion of the fiber optic connector 12. Similarly, the second end is provided with a connector port 32 for receiving the fiber optic connector 12, which is also only accessible through a pair of spring loaded shutters 34. Although the disclosed adapter 20 has two ports 26, 32 the disclosure is not limited to only such an embodiment, and the concepts presented herein are applicable for single port adapters without departing from the concepts presented herein.

The adapter housing 22 is shown as having a top side 36, a bottom side 38, a first sidewall 40, and a second sidewall 42 which extend between the first and second ends 24, 30. As shown, the adapter housing 22 has a width W1 extending between the first and second sidewalls 40, 42 and has a height H1 extending between the top and bottom sides 36, 38.

In one aspect, the adapter housing 22 defines a recessed area 44 for receiving a panel clip that can be used to secure the adapter 20 to a panel. The recessed area 44 represents a surface area of the housing 22 that is recessed with respect to the remaining portion of the outer surface of the housing 22. As shown, the recessed area 44 extends about the first sidewall 40, the bottom side 38, and the second sidewall 42 and provides an area for the panel clip to be snap-fit onto the housing 22.

The adapter housing 22 is further shown as including a slot structure 50. The slot structure 50 is for receiving an accessory connector which can take the form of various flanges, clips, support structures (e.g. support structures 100, 110, 120, and fixture 150, discussed later), interconnecting features (e.g. connector 140, discussed later), and other accessories. The slot structure 50 is configured as a recess within the adapter housing 22 and extends about the first sidewall 40, the bottom side 38, and the second sidewall 42. As shown, the slot structure 50 includes a first portion 52 recessed from the first sidewall 40, a second portion 54 recessed from the bottom side 38, and a third portion 56 recessed from the second sidewall 42. The first, second, and third portions 52, 54, 56 for a contiguous recess within the adapter housing 22. In the embodiment shown, the slot structure 50 is located at the midpoint of the adapter housing 22. However, other locations are possible without departing from the concepts herein.

As shown, the slot structure first portion 52 is formed by a pair of sidewalls 52a, 52b extending from an end wall 52c. Similarly, the slot structure second portion 54 is formed by a pair of sidewalls 54a, 54b extending from an end wall 54c while the slot structure third portion 56 is formed by a pair of sidewalls 56a, 56b extending from an end wall 56c. The distance between the sidewalls 52a/54a/56a and the sidewalls 52b/54b/56b is defined by a distance D1. Each of the end walls 52c and 56c is respectively recessed from the outer surface of the housing 22 by a distance D2 and D3 while the end wall 54c is recessed from the outer surface of the housing 22 by a distance D4. D2 and D3 can be equal to each other or can be different values. As a result of this configuration, the end walls 52c and 56c are separated by a width W2 that is equal to the first width W1 minus the sum of the second and third distances D2, D3. Similarly, the height H2 of the main housing 22 at the location of the slot structure 50 is equal to the height H1 minus the distance D4.

In one aspect, the slot structure 50 can be provided with one or more securing features for retaining the flange or clip within the slot structure 50. In the embodiment shown, the first portion 52 of the slot structure 50 is provided with a recessed notch 58 that extends around the sidewalls 52a, 52b and into the end wall 52c. Likewise, the third portion 56 of the slot structure 50 is provided with a recessed notch 60 that extends around the sidewalls 56a, 56b and into the end wall 56c. Accordingly, the notches 58, 60 can be used to receive corresponding protrusions extending from a flange or clip that extends to any of the sidewalls 52a, 52b and end wall 52c and/or sidewalls 56a, 56b and end wall 56c. Although a notch 58, 60 is shown in the embodiments presented, the securing feature could be a protrusion that extends into a corresponding notch or recess of the flange or clip. Additionally, the second portion 54 of the slot structure could be provided with a corresponding notch or protrusion instead of or in addition to the notches 58, 60.

Interconnection Arrangements

Referring to FIGS. 8-22, several embodiments and arrangements of fixtures and interconnection arrangements for joining a plurality of adapters 20 together are shown.

Figure 8:
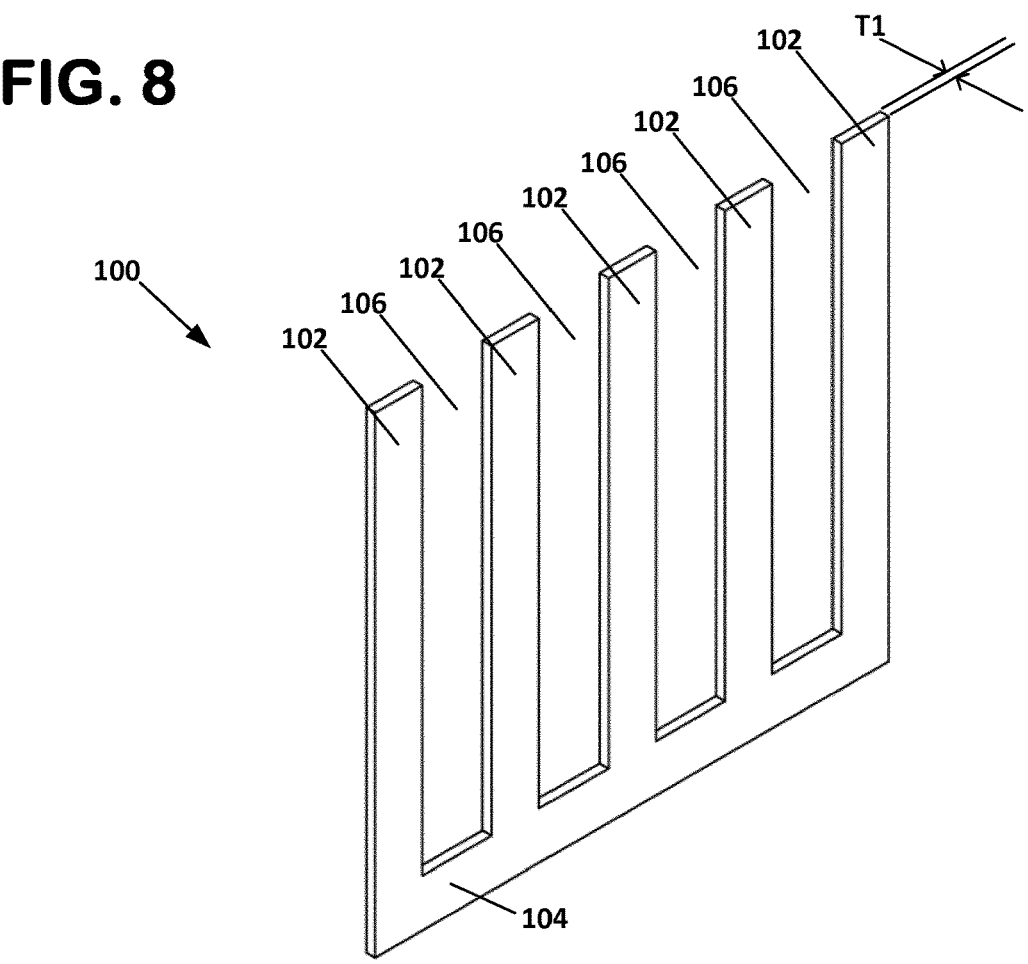
FIG. 8 is a perspective view of a first embodiment of a support structure for holding a plurality of the adapters shown in FIG. 1.
Figure 9:
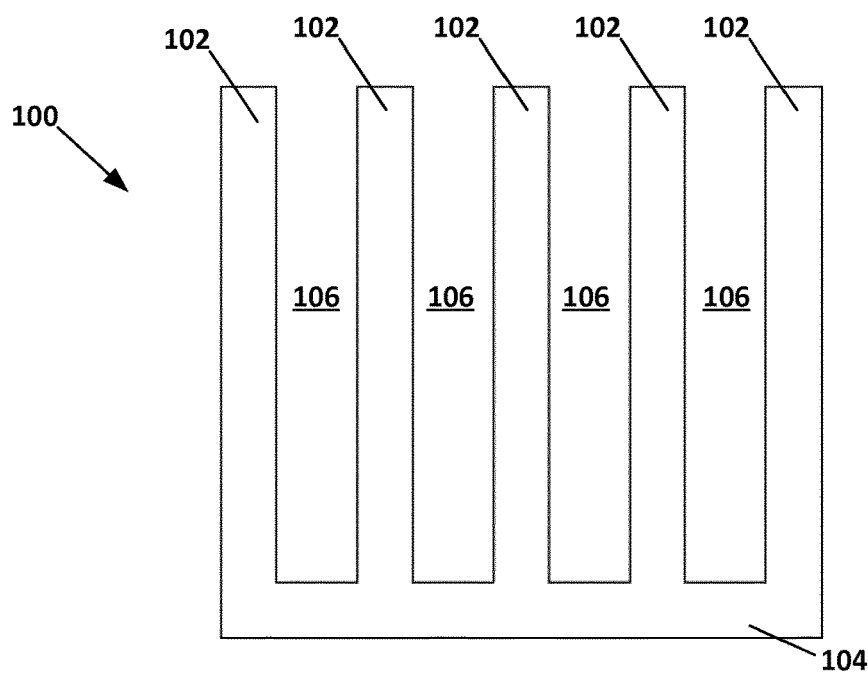
FIG. 9 is a front view for the support structure shown in FIG. 8.

Referring to FIGS. 8 and 9, a first support structure 100 is shown. The first support structure 100 is configured with a fork-shaped profile lying in a single plane in which a plurality of extension members 102 extend from a base member 104 to define spaced channels 106. The channels 106 are each configured to receive a plurality of adapters 20. This is accomplished by sliding an adapter 20 into the channels 106 such that the adjacent extension members 102 are received in the slot structure 50 of the adapter 20. The support structure 100 has a thickness T1 that is generally about the same as the opening dimension D1 of the slot structure 50. In the arrangement shown, four channels 106 are defined that can each hold up to five adapters 20. However, it should be appreciated that the support structure 100 could be configured to hold any number of columns and rows of adapters 20 without departing from the concepts herein. Where desired, the extension members 102 can be provide with protrusions for engaging with the notches 58, 60 of the adapter 20 to provide for either a snap-fit type connection or an indexing-type connection.

Figure 10:
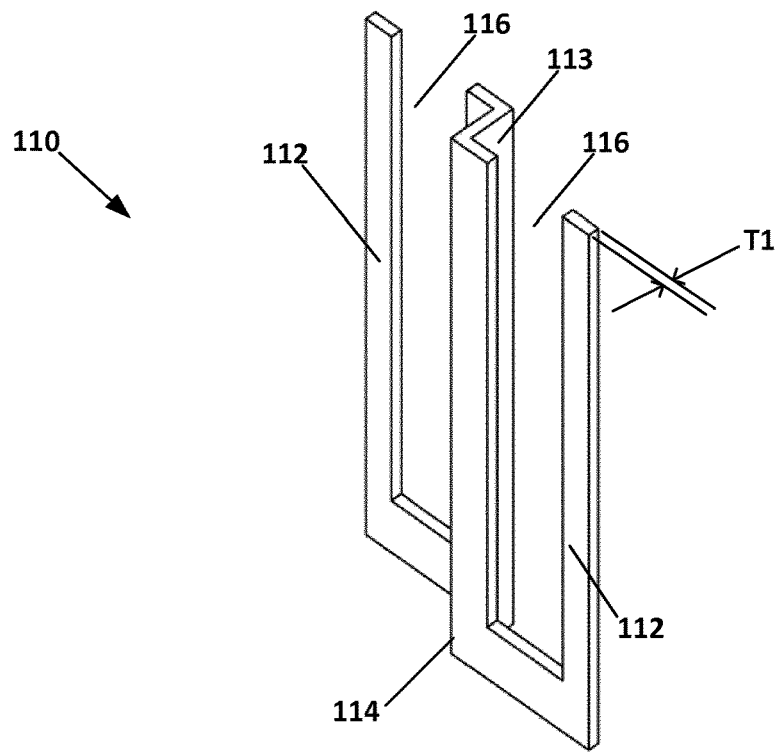
FIG. 10 is a perspective view of a second embodiment of a support structure for holding a plurality of the adapters shown in FIG. 1.
Figure 11:
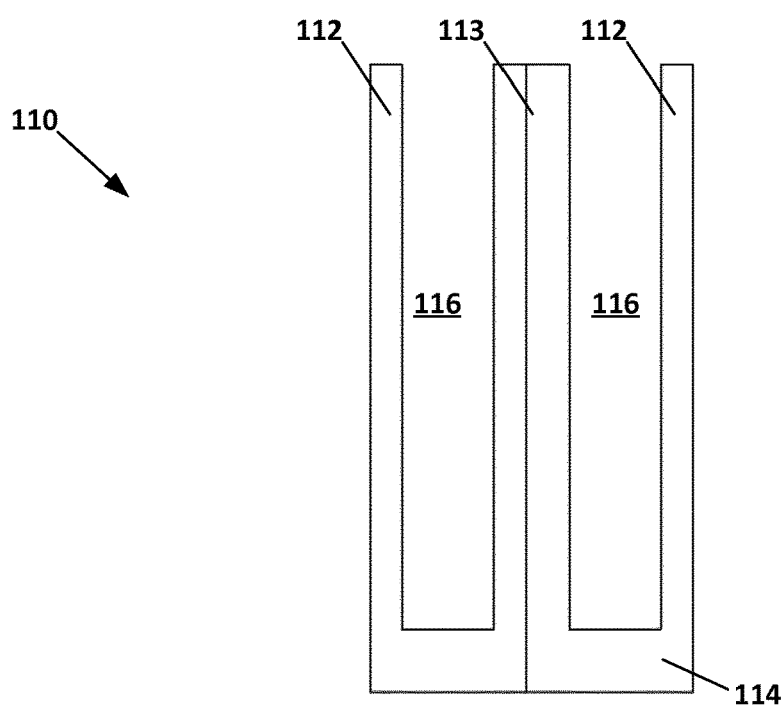
FIG. 11 is a front view for the support structure shown in FIG. 10.

Referring to FIGS. 10 and 11, a second support structure 110 is shown in which extension members 112, 113 extend from a base 114 to define channels 116 in multiple planes. The extension members 112, 113 are provided with a thickness T1 similar to those for the support structure 100. However, an intermediate extension 113 is provided with a z-shaped profile to offset the plane within which the adjacent channels are disposed. In the arrangement shown, two channels 116 are defined that can each hold up to five adapters 20. However, it should be appreciated that the support structure 110 could be configured to hold any number of columns and rows of adapters 20 without departing from the concepts herein. Additionally, any number and combination of extension members 112 and 113 may be utilized to create a desired number of channels 116 in one or several planes. For example, all of the intermediate extension members in the support structure 110 could be extension members 113.

Figure 12:
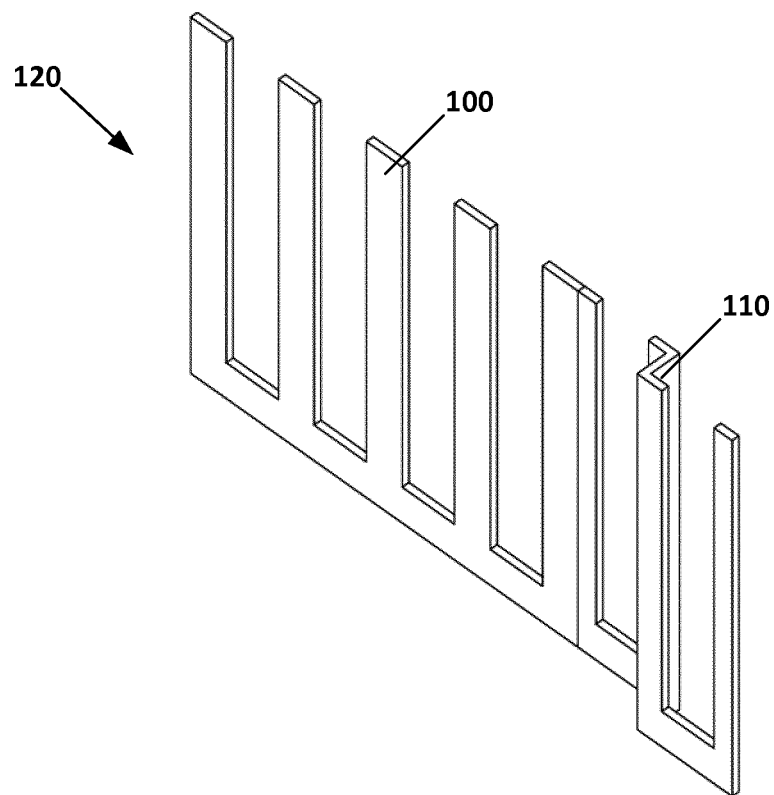
FIG. 12 is a perspective view of a third embodiment of a support structure for holding a plurality of the adapters shown in FIG. 1, the support structure being formed from the support structures shown in FIG. 8 and FIG. 10.
Figure 13:
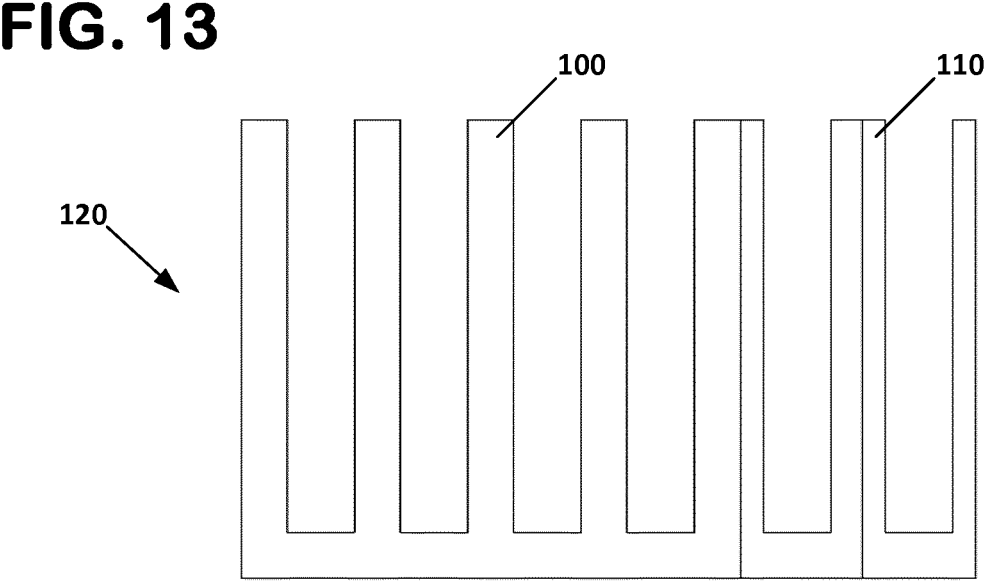
FIG. 13 is a front view for the support structure shown in FIG. 12.
Figure 14:
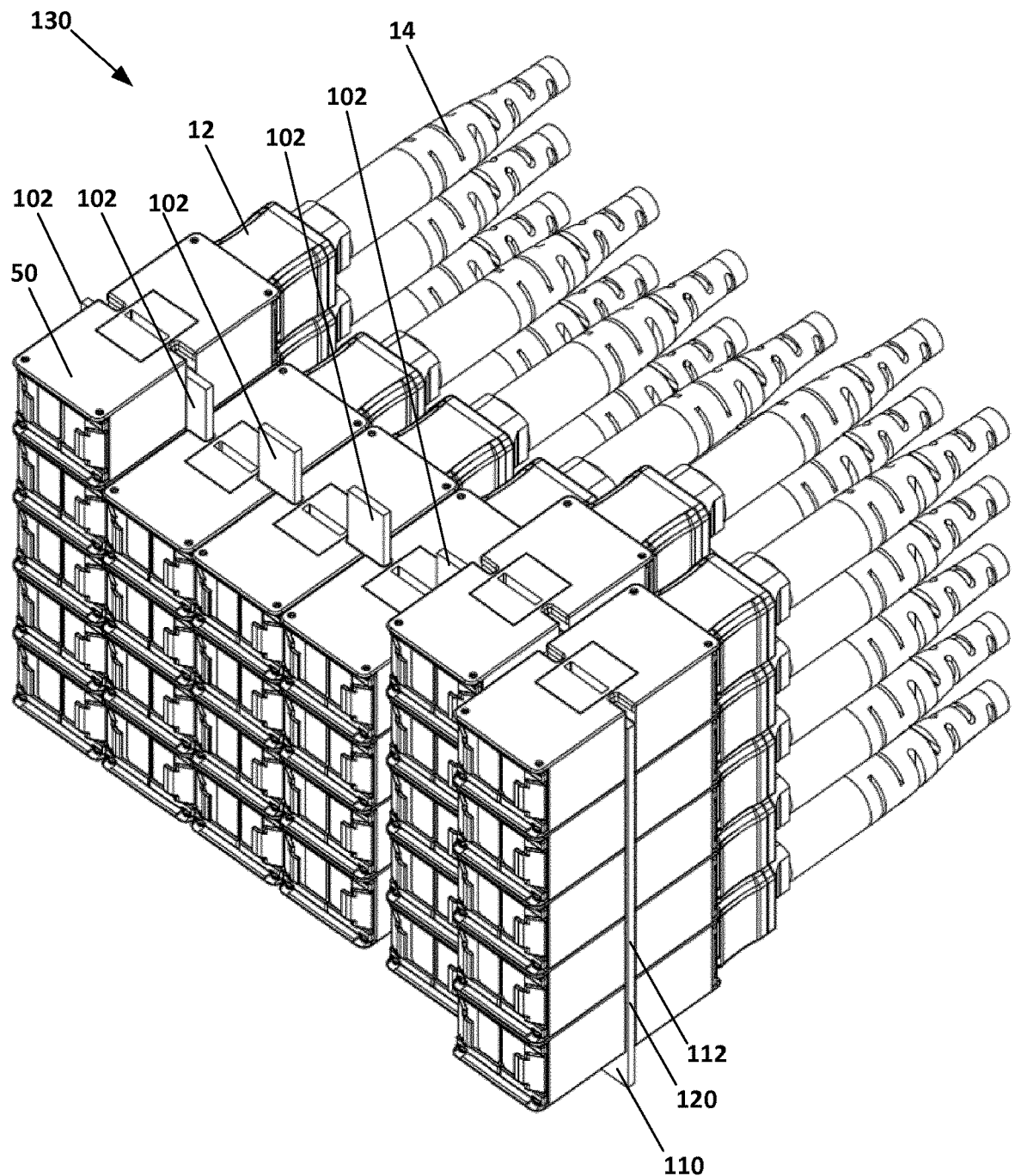
FIG. 14 is a perspective view of an adapter block assembly utilizing the support structure shown in FIG. 12 and a plurality of the adapters shown in FIG. 1.
Figure 15:
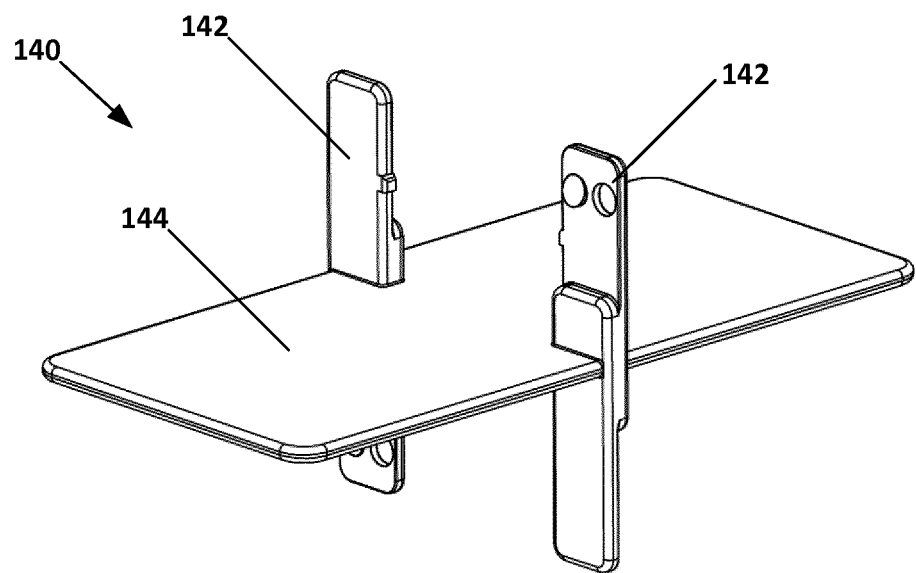
FIG. 15 is a perspective view of an adapter connector piece for use in connecting two of the adapters of the type shown in FIG. 1 together.
Figure 16:
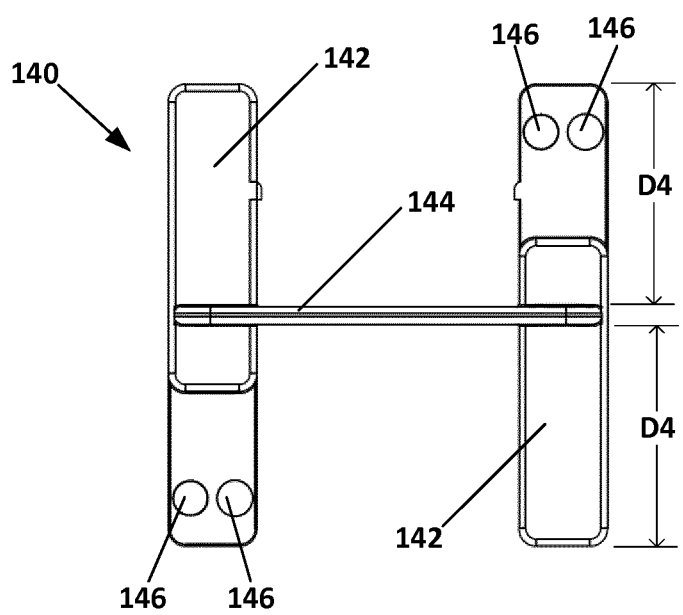
FIG. 16 is a front view of the adapter connector piece shown in FIG. 15.
Figure 17:
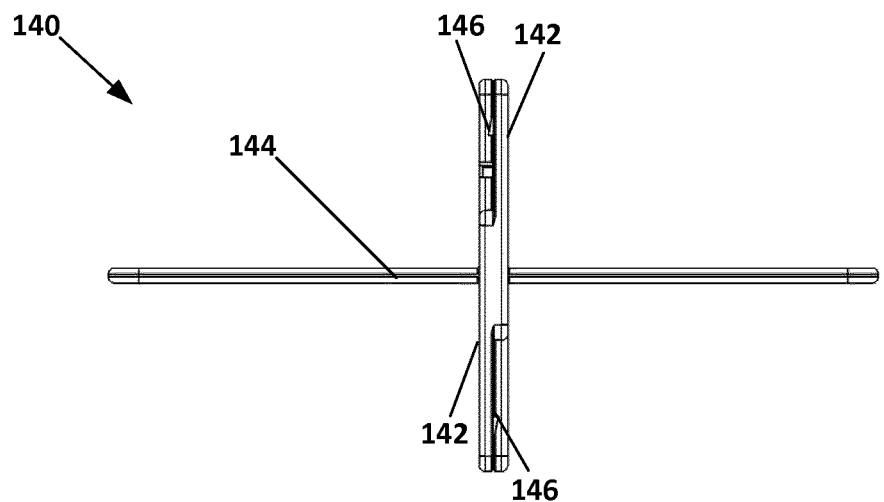
FIG. 17 is a side view of the adapter connector piece shown in FIG. 15.
Figure 18:
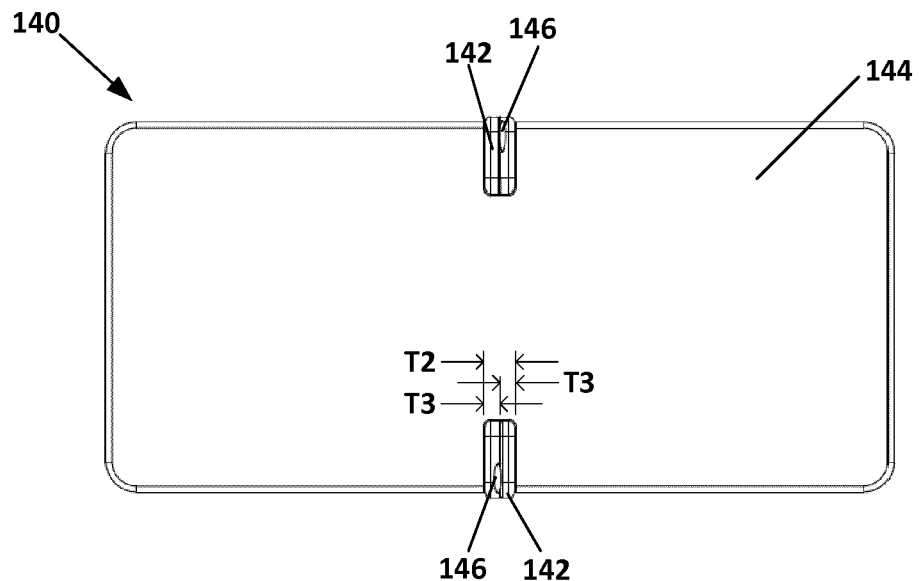
FIG. 18 is a top view of the adapter connector piece shown in FIG. 15.

FIGS. 12 and 13 show an embodiment of a support structure 120 in which the support structures 100 and 110 are joined together to form a single structure. This could be accomplished through bonding of the support structures 100, 110 together or could be accomplished by simply forming the support structure as a single unitary component 120 out of a material such as plastic or metal. FIG. 14 shows an example of how the support structure 120 can be utilized to form an adapter block assembly 130 by stacking adapters 20 directly on top of each other into each of the channels 106, 116. As can be seen, some of the channels are filled with five adapters 20 while others only have four adapters 20. This demonstrates the flexibility of such a system in that additional adapters 20 can be easily added at a later time.

The disclosed configuration also allows for a high density solution in which the adapters can be in direct contact with each other in either or both the horizontal and vertical directions (i.e. in contact with other adapters 20 above and below, and from side to side). Where each of the adapters 20 is configured to receive a 144 multi-fiber connector 12, the support structures 100, 110, and 130 can support about 30 fibers per square centimeter or more when using the overall height and width of the stacked adapters 20 as the basis for the area.

Referring to FIGS. 15-18 and adapter connector 140 is shown. Adapter connector 140 is for connecting two adapters 20. As shown, the adapter connector includes a pair of oppositely positioned legs 142 that are connected together by a base member 144 intersecting the midpoint of the legs 142. The base member 144 has a width and length that generally matches that of the adapter 20 such that the base member 144 does not project beyond the adapter 20. In other arrangements, the base member 144 can be configured with a larger or smaller dimension, in one or more directions, than the adapters 20.

The legs 142 are configured to be received into the slot structure 50 of the adapter 20 along the first and third portions 52, 56. The legs have a thickness T2 near the base member 144 and a thickness T3 that is about half the thickness of the thickness T2. This half thickness allows for a leg 142 of one connector 140 to overlap with and connect to the leg 142 of another connector 140 such that the overlapping portions add up to the thickness T2. The legs 142 have a width that is about the same as the depth D2/D3 of the slot structure first and third portions 52, 56 such that the legs 142 do not extends beyond the sides 40, 42 of the adapter 20 once installed.

At the half thickness portion of the leg 142 a pair of oppositely positioned snap-fit connection points 146 are provided, wherein one of connection points is a ramped protrusion and the other of the connection points is a recess for receiving the ramped protrusion. As shown, the pair snap-fit connection points 146 are located on only one end of the leg 142. However, both ends of the legs 142 could be provided with snap-fit connection points 146.

Once the legs 142 are inserted into the slot structure 50 and are overlapping, the snap-fit connection points 146 of one leg 142 snap-fit with the snap-fit connection points 146 of the overlapping leg 142. As the thickness T2 or T3+T3 is about the same as the width D1 of the slot structure 50, the legs 142 are constrained by walls 56a/56b and 52a/52b such that the snap-fit connection must occur in order for the legs 142 to be fully inserted such that the base structure 144 is adjacent the top surface 36 and/or bottom surface 38 of the adapter housing 22.

Figure 19:
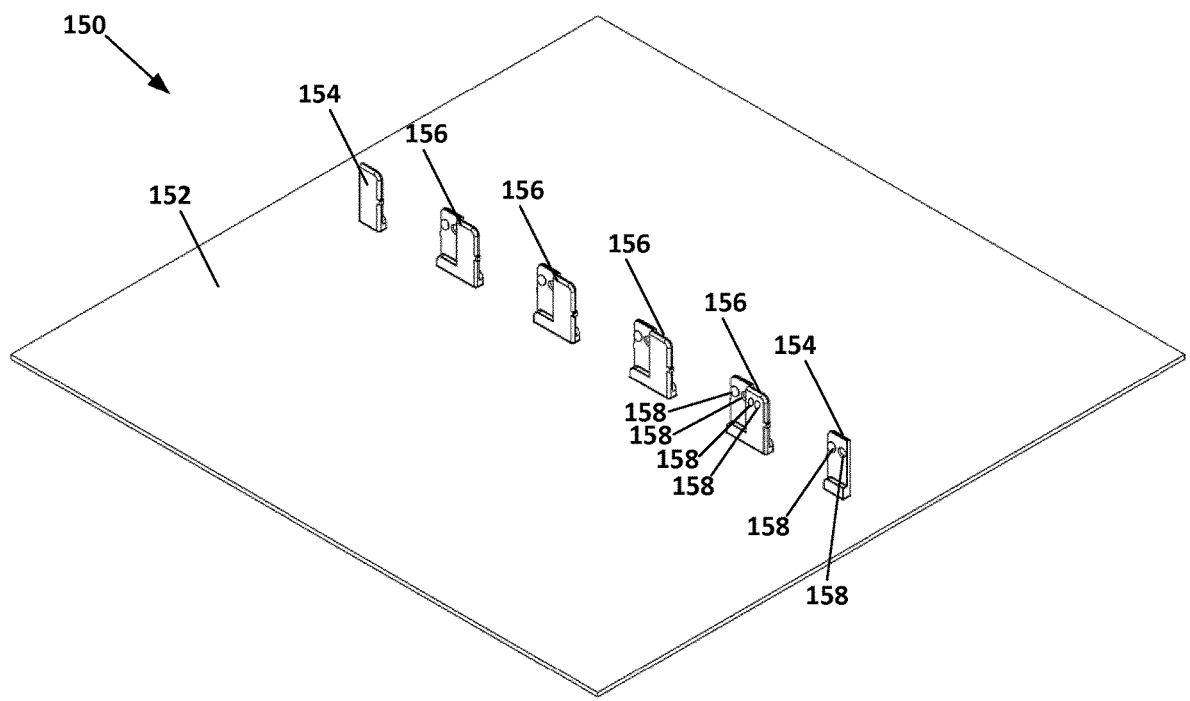
FIG. 19 is a perspective view of a fixture for use in connecting together a plurality of the adapters shown in FIG. 1.
Figure 20:
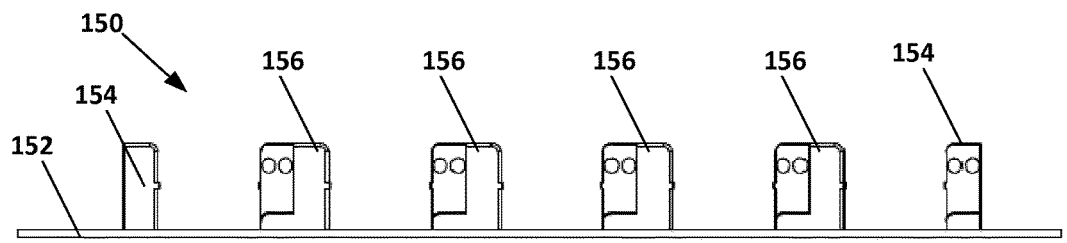
FIG. 20 is a front view of the fixture shown in FIG. 19.

Referring to FIGS. 19 and 20, a fixture 150 is shown for supporting a plurality of adapters 20 aligned in a single row array. The fixture 150 and the connectors 140 can be used together to form an adapter block assembly 160. As shown, the fixture 150 includes a base portion 152 and a plurality of extension members 154/156 configured to form a snap-fit connection with the legs 142 of the connectors 140.

The extension members 154 are configured generally similarly to the legs 142 in that they have a width that is about the same as the depth D2/D3 of the slot structure first and third portions 52, 56. The extension members 154 are located on the outbound ends of the array and therefore only connect to one side of a single adapter 20. Each of the extension members 154 is provided with a pair of snap-fit connection points 158 configured for forming a snap-fit connection with the snap-fit connection points 146 of the leg 142 to which it is attached.

In contrast to the outbound extension members 154, the intermediate extension members 156 have double the width equal to two times the depth D2/D3 of the slot structures such that each extension member 156 can extend horizontally between the slot structures 50 of adjacent adapters 20. To facilitate a secure connection between the extension members 156 and the two connectors 140 which will be ultimately attached, each extension member 156 is provided with two pairs of snap-fit connection points 158. This configuration allows for a snap-fit connection between the snap-fit connection points 158 and the snap-fit connection points 146 of the connector legs 142. Similar to the legs 142, each side of the extension member 156 is provided at a half thickness T3 such that the overlapping part of the extension member 156 and the leg 142 combine to have a width T2.

Figure 21:
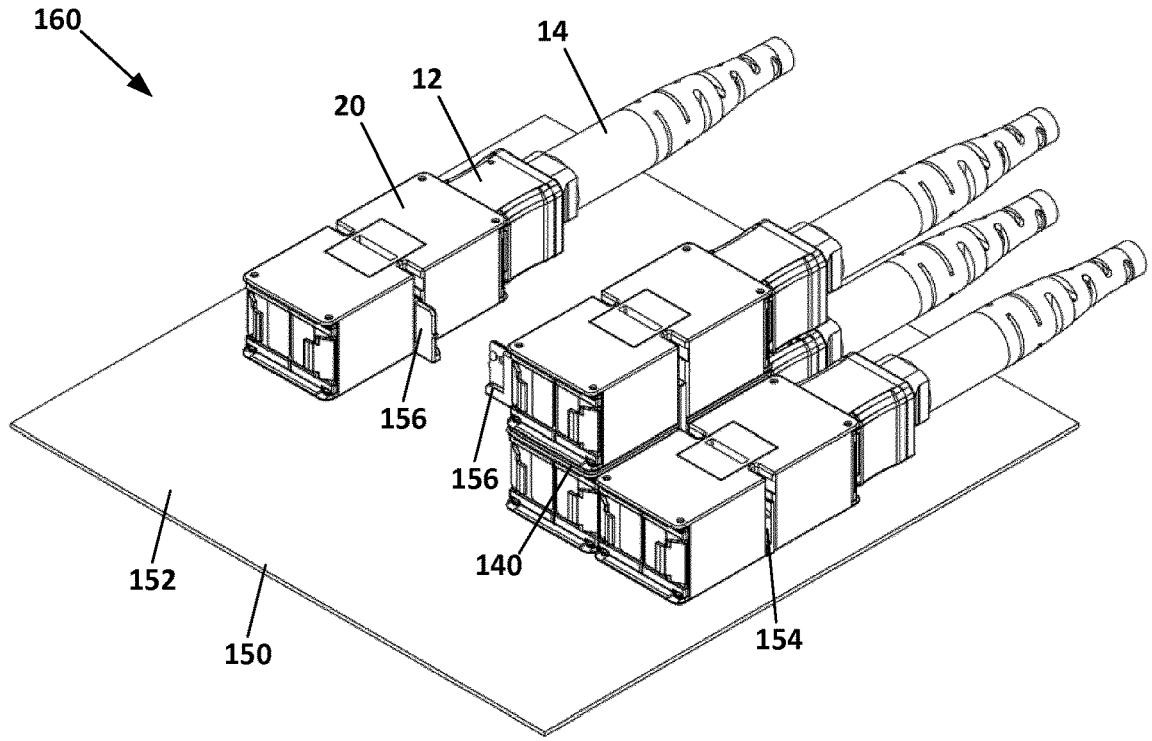
FIG. 21 is a perspective view of an adapter block assembly utilizing the connector pieces shown in FIG. 15 and the fixture shown in FIG. 19.
Figure 22:
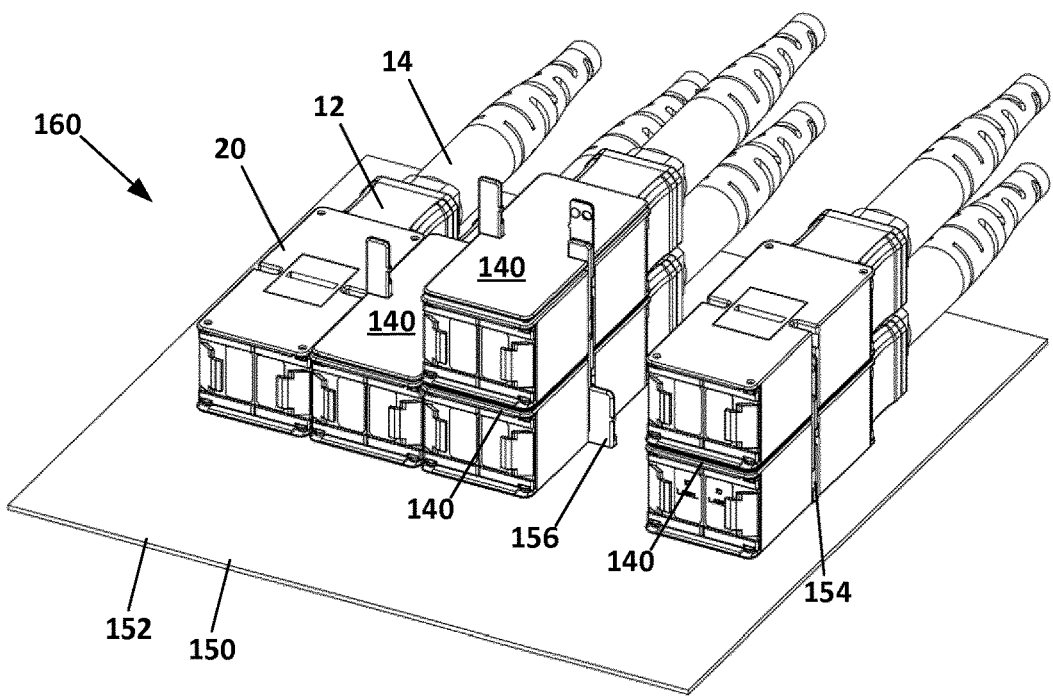
FIG. 22 is a perspective view of an adapter block assembly utilizing the connector pieces shown in FIG. 15 and the fixture shown in FIG. 19.

Referring to FIGS. 21 and 22, connector block assemblies 160 are shown utilizing the fixture 150 and the connectors 140. As can be readily appreciated, the fixture 150 and connectors 140 provide for a method of constructing a connector block assembly 160 in which adapters 20 are initially placed between the extension members 154 and/or 156 of the fixture 150 at desired locations. Once those adapters 20 have been installed, a second row of adapters 20 can be built. To facilitate this, the connectors 140 are placed on top of the adapters 20 and depressed until the legs 142 of the connectors 140 snap-fit onto the extension members 154/156. This action fully secures the adapter 20 to the fixture as the extension members 154/156 and legs 142 prevent axial and lateral movement of the adapter 20 and the snap-fit connection between the extension members 154/156 and legs 142 prevents vertical and lateral movement of the adapter 20. The adapter block assembly 160 can continue to be built by alternatingly placing adapters 20 onto the connectors 140 and placing connectors 140 on top of the adapters 20 until the desired configuration is obtained. It is noted that the connectors 140 can be utilized independently from the fixture 150 to interconnect any number of desired adapters 20.

This system and method of building an adapter block assembly 160 provides for a high density solution while minimizing the initial investment required to build a smaller configuration that can be later expanded. Additionally, the investment in some supporting hardware can be entirely avoided if the system is not eventually fully expanded.

Additional Interconnection Arrangements

Referring to FIGS. 23-39, several additional embodiments of accessory connectors for installation on the adapter 20 are shown.

Figure 23:
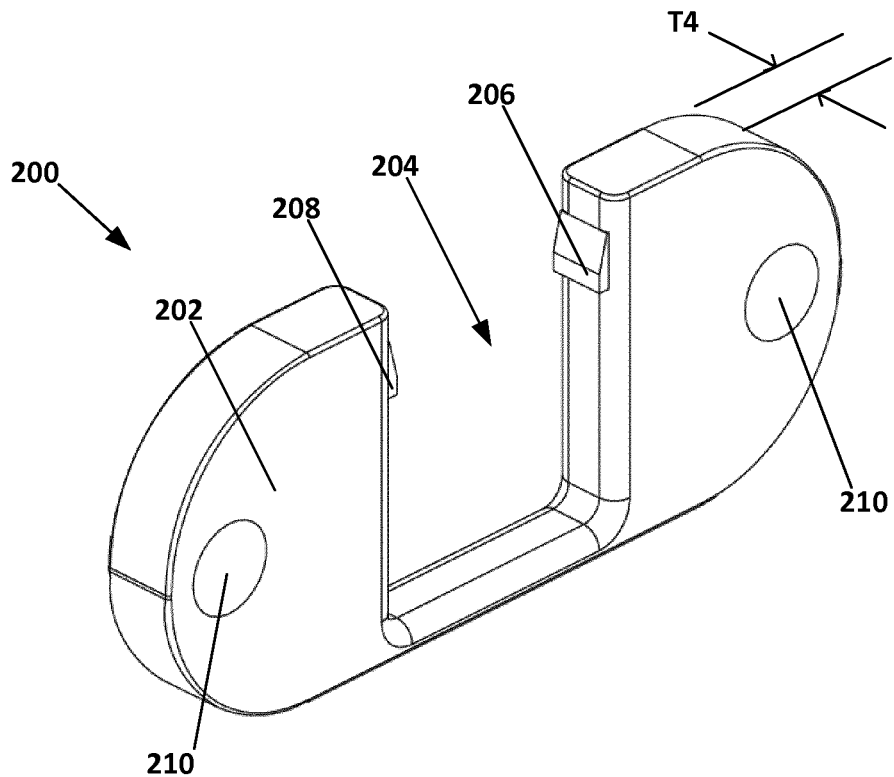
FIG. 23 is a perspective view of a first embodiment of a flange clip usable with the adapter shown in FIG. 1.
Figure 24:
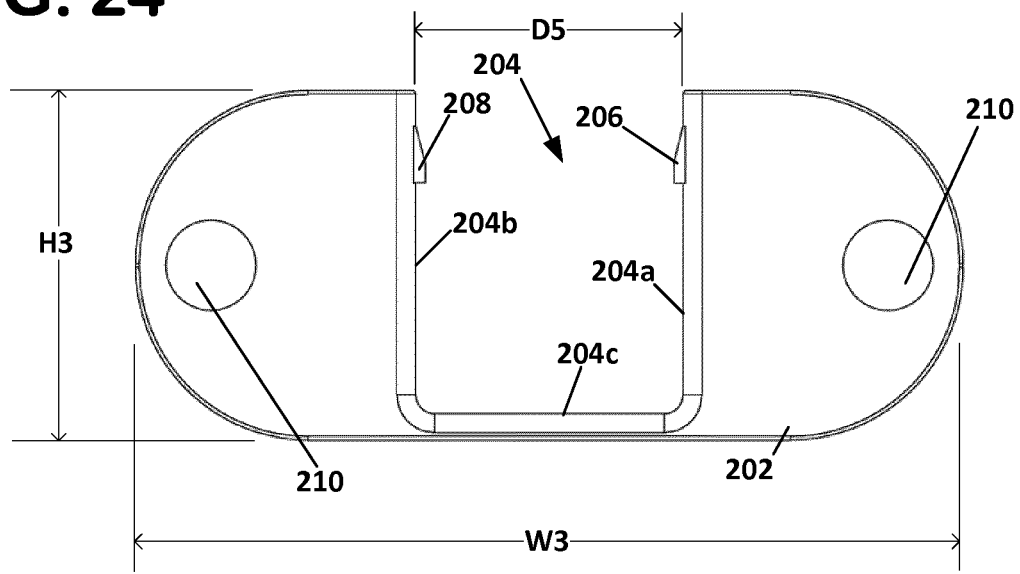
FIG. 24 is a front view of the flange clip shown in FIG. 23.

FIGS. 23 and 24 show a first flange clip 200 configured to be mounted to the adapter 20 via the slot structure 50. As shown, the flange clip 200 includes a main body 202 having a generally u-shaped opening 204 defining side edges 204a, 204b, and 204c. The u-shaped opening 204 has an opening dimension D5 that is about equal to the width W2. The main body 202 is provided with a thickness T4 that is the same or slightly less than the distance D1 of the slot structure 50. Additionally, the main body 202 has a height H3 that is about the same as the height H1 of the adapter main housing 22. The main body 202 defines a width W3 that is larger than the width W1 of the adapter main housing 22. To facilitate insertion of the clip 200, the side edges 204a, 204b, and 204c are provided with a radiused or curved cross-sectional shape.

As shown at FIGS. 28-33, the flange clip 200 can be slid into the slot structure 50 such that the adapter main housing 22 is received into the opening 204 of the flange clip main body 202. The flange clip 200 is also shown as being provided with ramped protrusions 206 and 208 that are respectively configured to be received into notches 58 and 60 of the adapter slot structure 50. Taken together, the ramped protrusions 206, 208 and notches 58, 60 provide for a snap-fit type connection between the flange clip 200 and the adapter main housing 22. This connection is shown in greater detail in cross-sectional view of FIG. 33. The flange clip 200 may also be provided with apertures 210. Apertures 210 can receive fasteners which can be utilized to secure the flange clip 200, and thus the adapter 20, to a fixture such as a panel.

Figure 25:
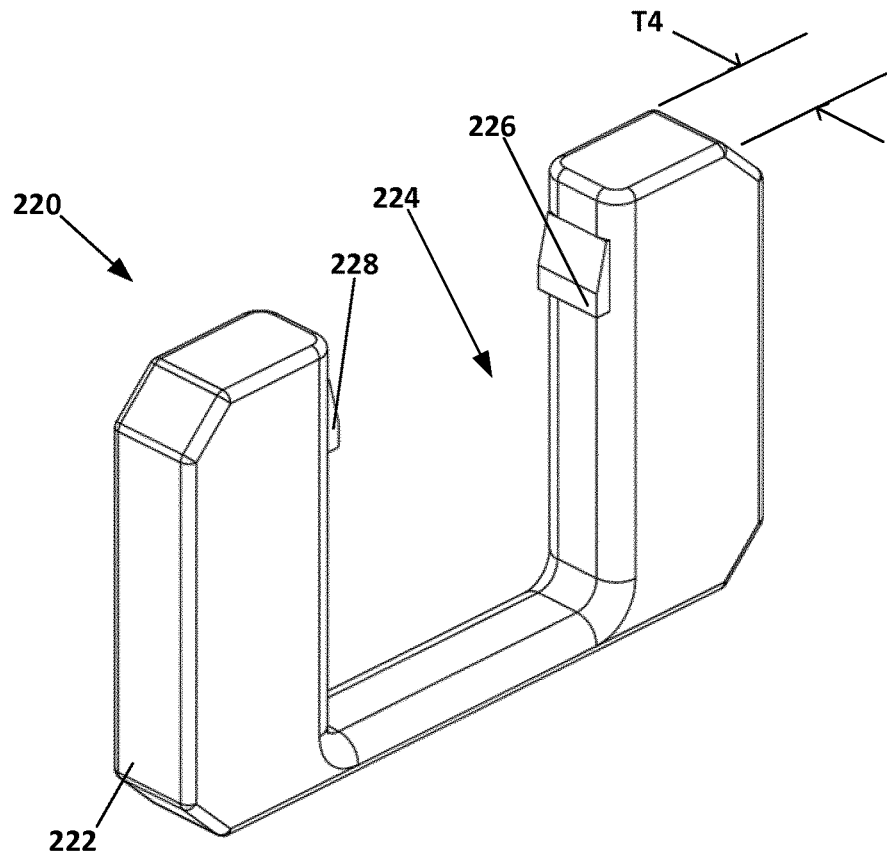
FIG. 25 is a perspective view of a second embodiment of a flange clip usable with the adapter shown in FIG. 1.
Figure 26:
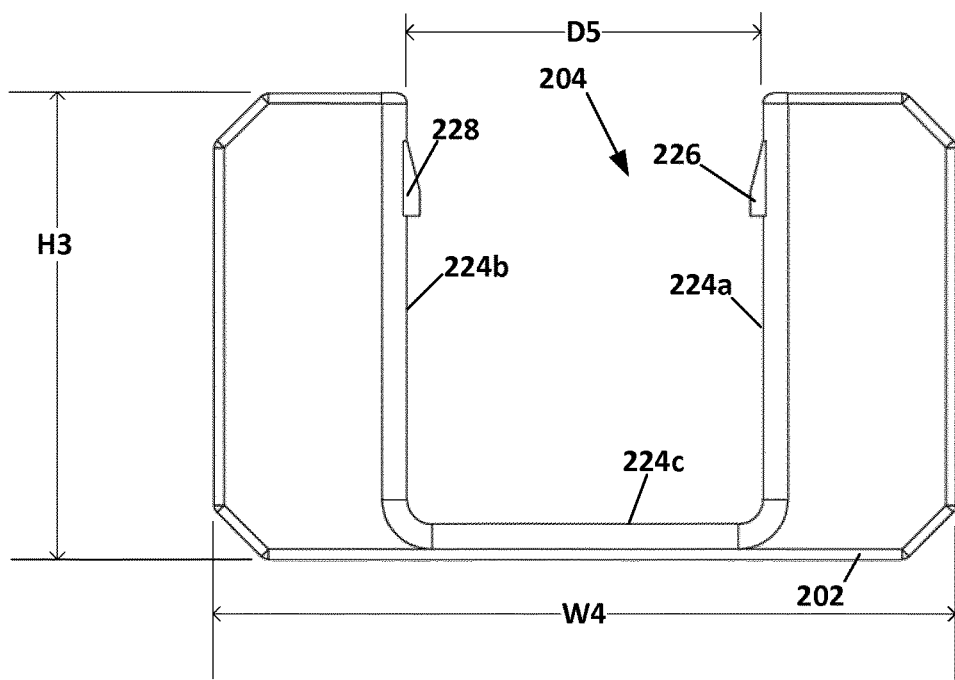
FIG. 26 is a front view of the flange clip shown in FIG. 25.

FIGS. 25 and 26 show a second flange clip 220 configured to be mounted to the adapter 20 via the slot structure 50. As shown, the flange clip 120 includes a main body 122 having a generally u-shaped opening 124 defining side edges 124a, 124b, and 124c. The u-shaped opening 124 has an opening dimension D5 that is about equal to the width W3. The main body 122 is provided with a thickness T4 that is the same or slightly less than the distance D1 of the slot structure 50. Additionally, the main body 222 has a height H3 that is about the same as the height H1 of the adapter main housing 22. The main body 222 defines a width W4 that is slightly larger than the width W1 of the adapter main housing 22, but that is less than width W3 of the first flange clip 200. To facilitate insertion of the clip 220, the side edges 224a, 224b, and 224c are provided with a radiused or curved cross-sectional shape.

As shown at FIGS. 34-39, the flange clip 220 can be slid into the slot structure 50 such that the adapter main housing 22 is received into the opening 224 of the flange clip main body 222. The flange clip 220 is also shown as being provided with ramped protrusions 226 and 228 that are respectively configured to be received into notches 58 and 60 of the adapter slot structure 50. Taken together, the ramped protrusions 226, 228 and notches 58, 60 provide for a snap-fit type connection between the flange clip 220 and the adapter main housing 22. This connection is shown in greater detail in cross-sectional view of FIG. 24.

Figure 27:
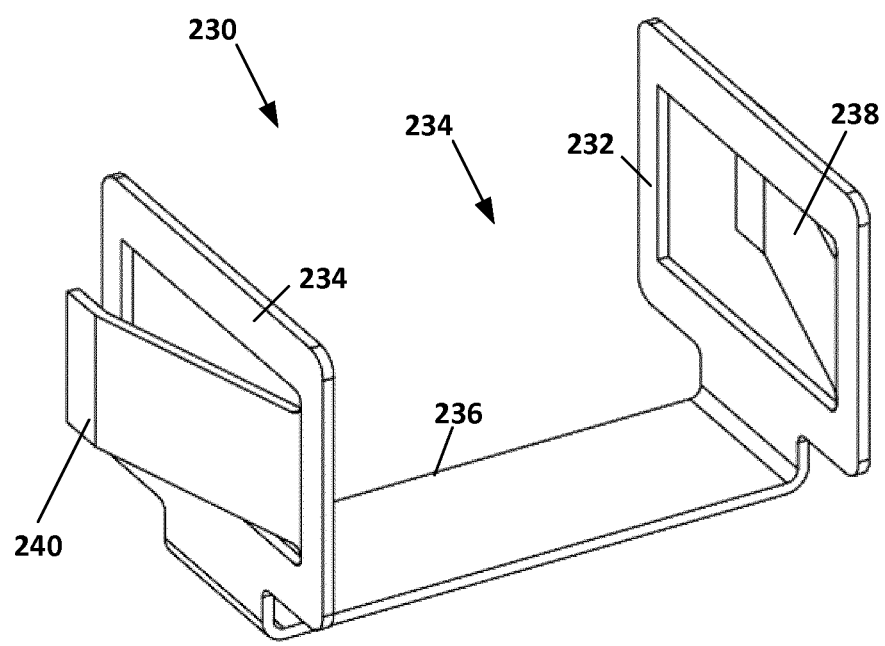
FIG. 27 is a perspective view of a panel clip usable with the adapter shown in FIG. 1.
Figure 28:
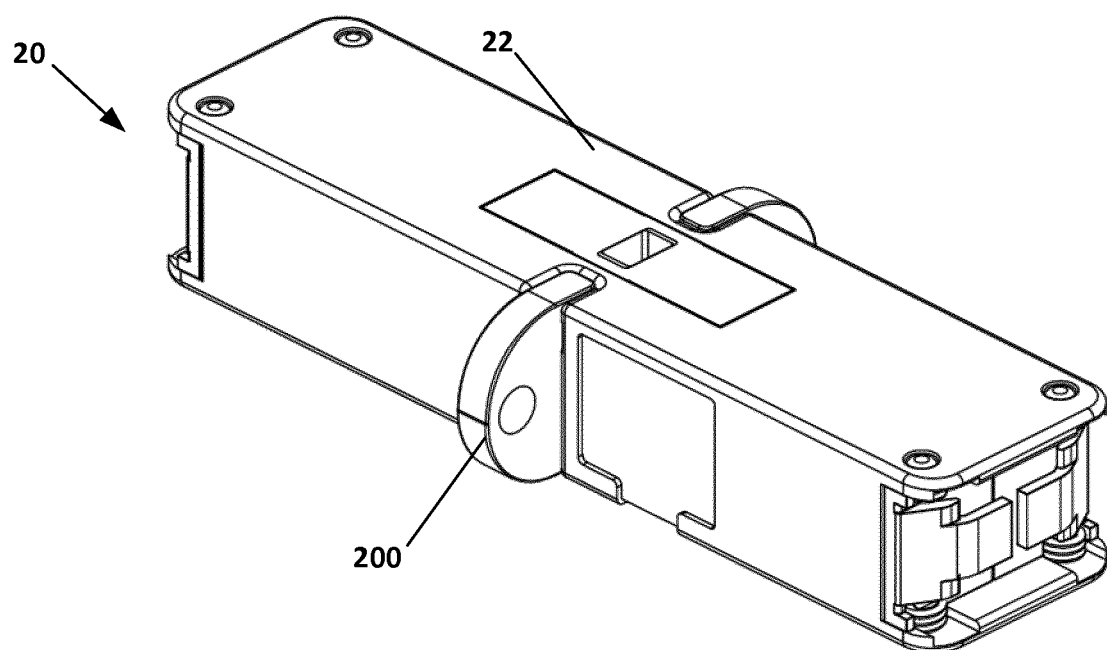
FIG. 28 is a perspective view of the adapter shown in FIG. 1 with the flange clip of FIG. 23 installed onto the adapter.
Figure 29:
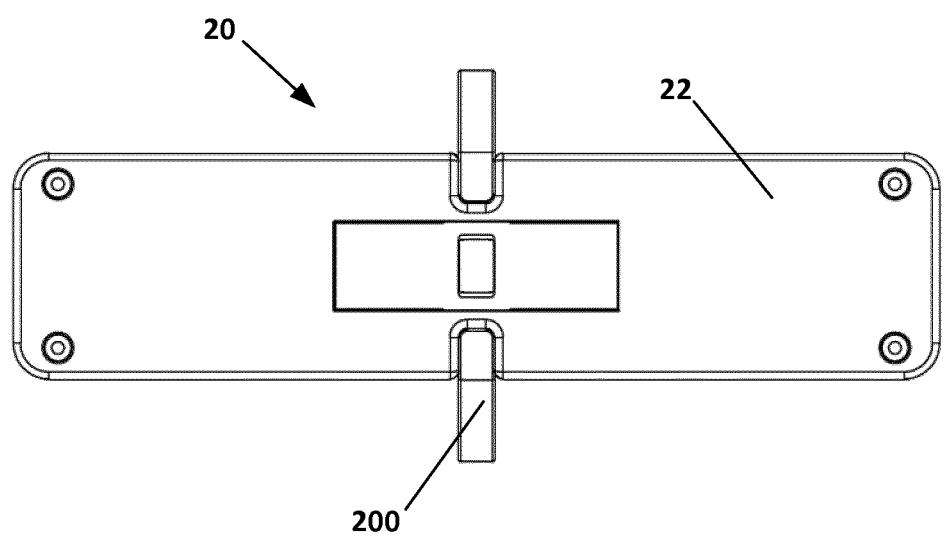
FIG. 29 is a top view of the adapter and flange clip shown in FIG. 28.
Figure 30:
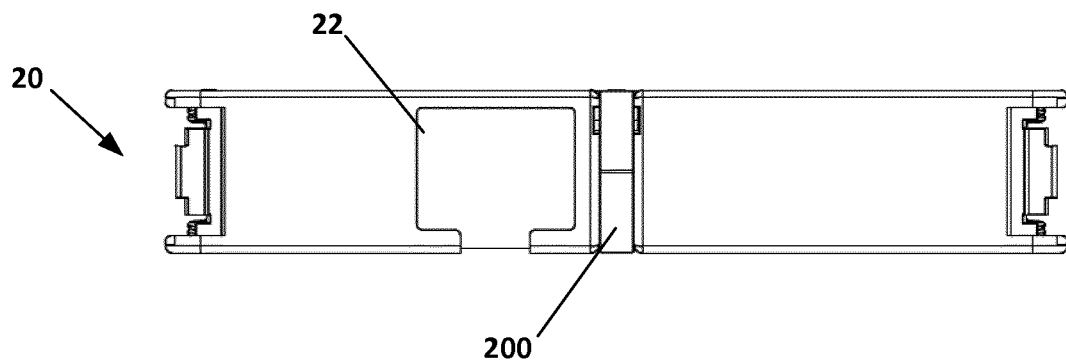
FIG. 30 is a side view of the adapter and flange clip shown in FIG. 28.
Figure 31:
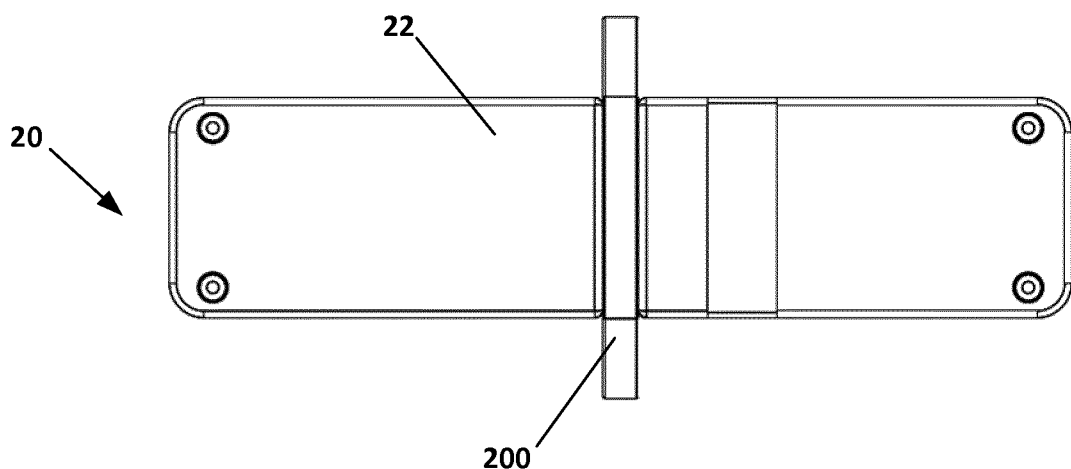
FIG. 31 is a bottom view of the adapter and flange clip shown in FIG. 28.
Figure 32:
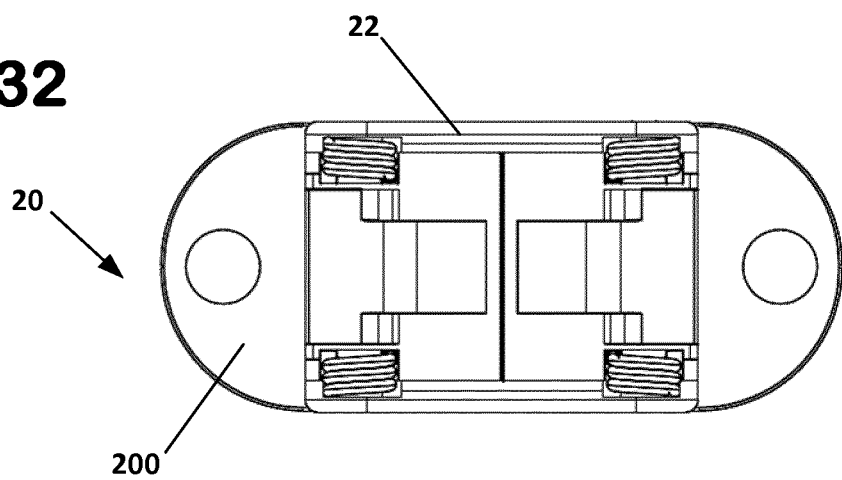
FIG. 32 is a front view of the adapter and flange clip shown in FIG. 28.
Figure 33:
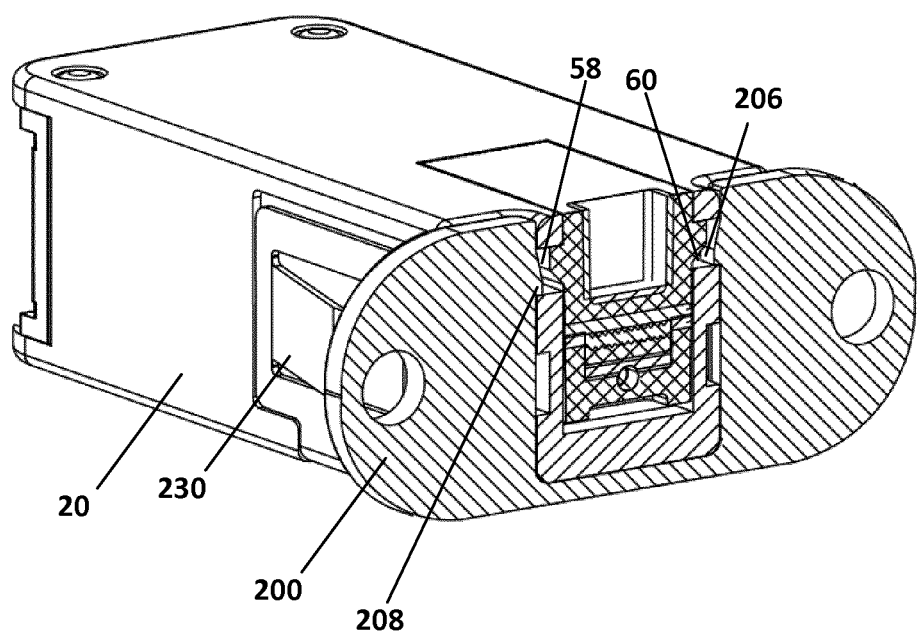
FIG. 33 is a cross-sectional perspective view of the adapter and flange clip shown in FIG. 28.
Figure 34:
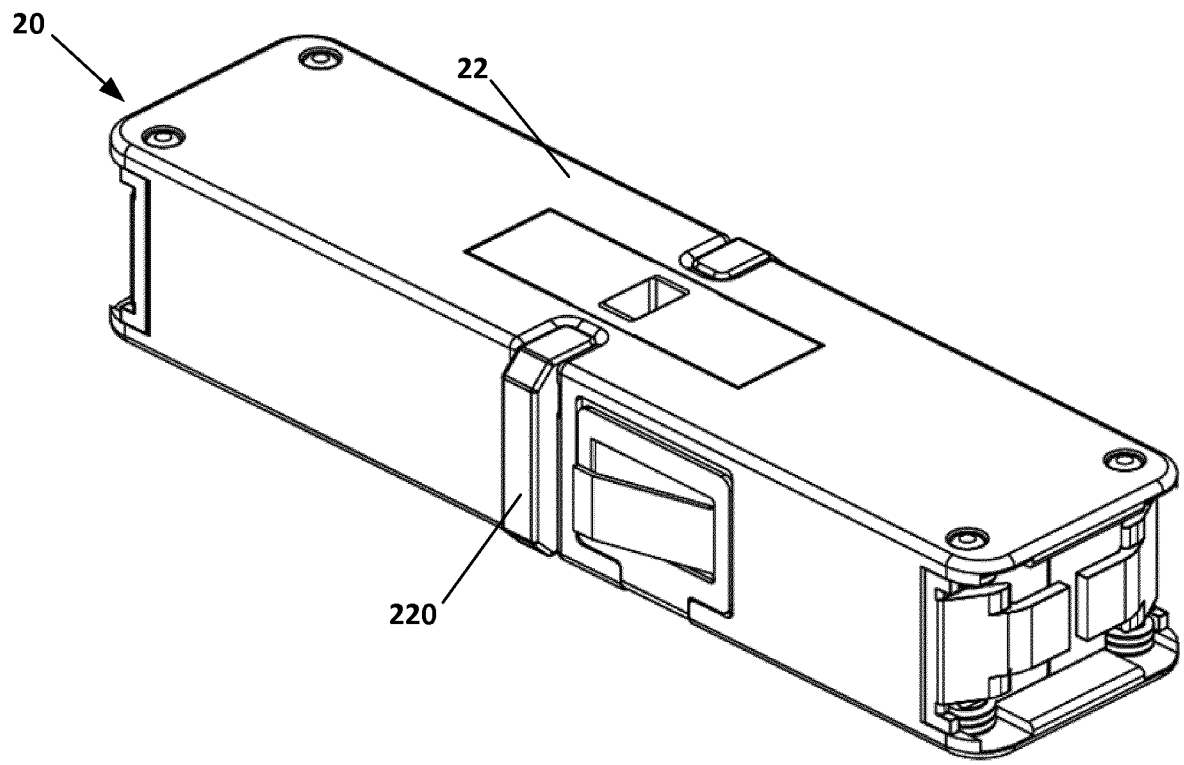
FIG. 34 is a perspective view of the adapter shown in FIG. 1 with the flange clip of FIG. 25 and the panel clip of FIG. 27 installed onto the adapter.
Figure 35:
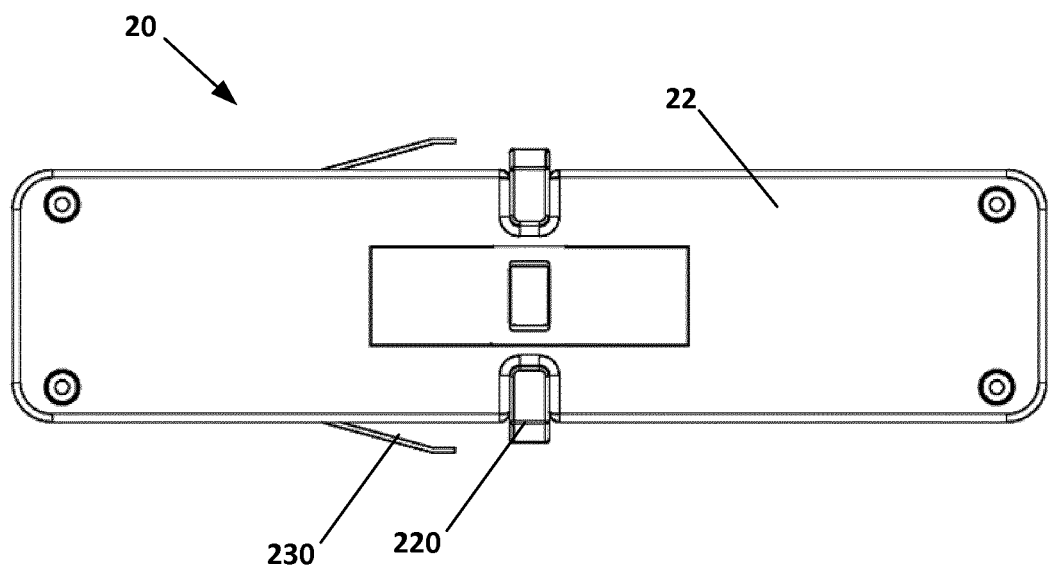
FIG. 35 is a top view of the adapter, flange clip, and panel clip shown in FIG. 34.
Figure 36:
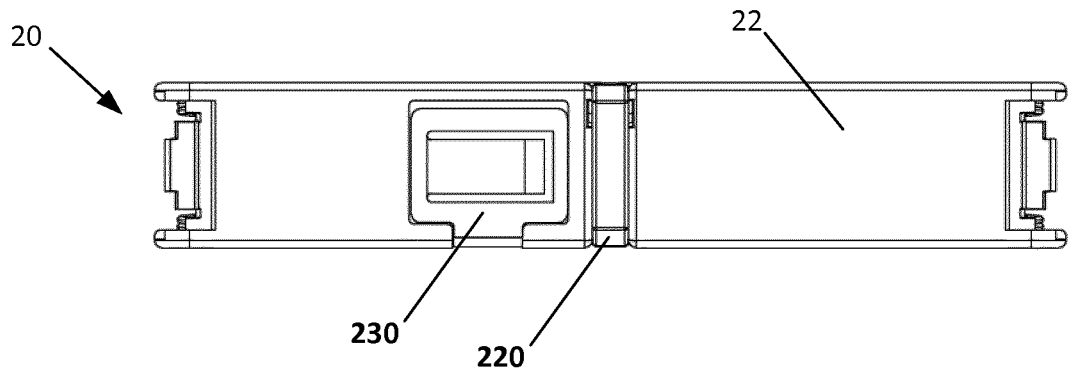
FIG. 36 is a side view of the adapter, flange clip, and panel clip shown in FIG. 34.
Figure 37:
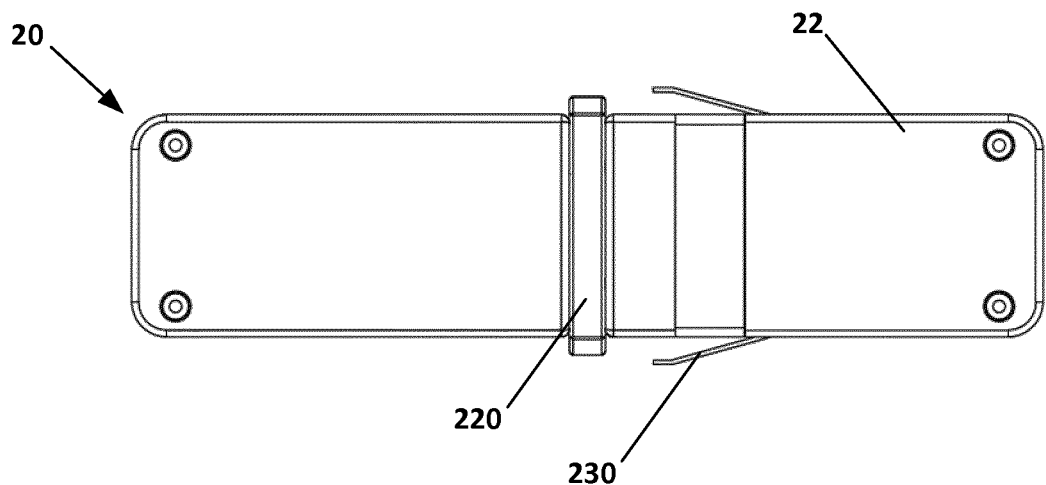
FIG. 37 is a bottom view of the adapter, flange clip, and panel clip shown in FIG. 34.
Figure 38:
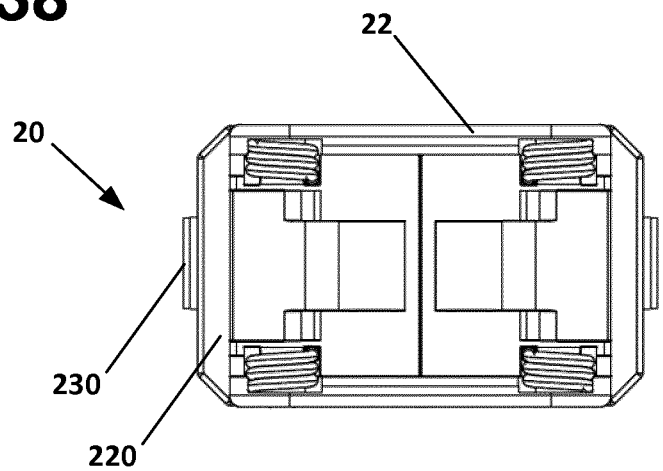
FIG. 38 is a front view of the adapter, flange clip, and panel clip shown in FIG. 34.
Figure 39:
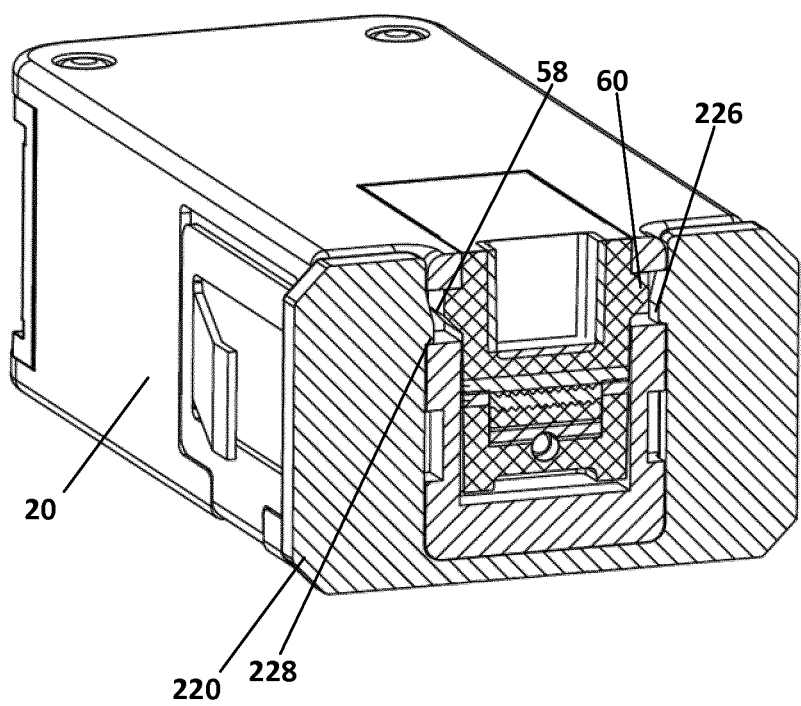
FIG. 39 is a cross-sectional perspective view of the adapter, flange clip, and panel clip shown in FIG. 28.

Referring to FIG. 27, the panel clip 230 is shown in greater detail. As stated previously, the panel clip 230 is configured to be mounted to the adapter 20 via the recessed area 44 in the adapter housing 22. As shown, the panel clip 230 is formed as a generally u-shaped member having a first portion 232, a second portion 134, and a third portion 236 extending between the first and second portions 232, 234. In one example, the panel clip 230 is formed from a metallic material, wherein the panel clip 230 can be snapped into the recessed area 44 by virtue of the shape of the panel clip 230 and the spring properties of the material. As shown, the first portion 232 includes a first clip portion 238 while the second portion 234 includes a second clip portion 240.

The panel clip 230 is shown as being installed on the adapter 20 at FIGS. 33-39. In one aspect, the first and second clip portions 238, 240 of the panel clip 230 are directed towards the flange 200/220. This configuration allows for the adapter 20 and the attached panel clip 230 to be inserted through an opening of a panel (or other fixture) up to the point that the flange 200/220 contacts the panel. As the panel clip 230 passes fully through the panel, the clip portions 238, 240 expand and lock against the back side of the panel. At this point, the panel clip 230 and flange 200/220 sandwich the panel to secure the adapter 20 to the panel. Although not shown at FIGS. 28-32, the panel clip 230 can be easily installed onto the adapter 20 regardless of which flange 200/220 is mounted to the main housing 22 of the adapter 20.

The concepts disclosed herein result in lower manufacturing costs as the same housing 22 can be used in many network applications by simply pairing the housing 22 with the desired flanges and/or panel clips. This modular approach further allows for easy introduction of new flanges and panel clips that will meet future design criteria without requiring a redesign of the housing 22.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

REFERENCE NUMERALS

10 Fiber optic connection system
12 First fiber optic connection component/male fiber optic connector
14 First fiber optic cable
20 Adapter
22 Housing
24 First end
26 First port
28 Spring loaded shutter
30 Second end
32 Second port
34 Spring loaded shutter
36 top side
38 bottom side
40 first side
42 second side
44 recessed area for panel clip
50 slot structure
52 first portion
52a sidewall
52b sidewall
52c end wall
54 second portion
54a sidewall
54b sidewall
54c end wall
56 third portion
56a sidewall
56b sidewall
56c end wall
58 notch
60 notch
100 support structure
102 extension member
104 base
106 channel or opening
110 support structure
112 extension member
113 extension member
114 base
116 channel or opening
120 support structure
130 adapter block assembly
140 connector
142 leg
144 base
146 snap-fit connecting point
150 fixture
152 base
154 extension members
156 extension members
158 snap-fit connecting point
200 first flange
202 body
204 recess
204a side edge
204b side edge
204c side edge
206 first projection
208 second projection
210 apertures
220 second flange
222 body
224 recess
224a side edge
224b side edge
224c side edge
226 first projection
228 second projection
230 panel clip
232 first portion
234 second portion
236 third portion
238 first clip portion
240 second clip portion
D1 first distance D2 second distance
D3 third distance
D4 fourth distance
H1 first height
T1 first thickness
T2 second thickness
T3 third thickness
T4 forth thickness
W1 first width
W2 second width

What is claimed is:

1. An adapter block assembly comprising:
a plurality of stackable adapters, each of the adapters including:
a housing having opposing top and bottom sides defining a first height and having opposing first and second sidewalls defining a first width, the housing extending between a first end and a second end, wherein the housing includes at least one port for receiving a fiber optic connector;
a slot structure defined with the housing, the slot structure including a first slot segment extending along the first sidewall and a second slot segment extending along the second sidewall;
a support structure holding the plurality of adapters, the support structure including a plurality of extension members defining at least one open channel, each of the adapters being received into the at least one open channel adjacent to each other to form a stack, wherein one of the plurality of extension members is received into the first slot segment of at least some of the plurality of adapters and another of the plurality of extension members is received into the second slot segment of the at least some of the plurality of adapters.

2. The adapter block assembly of claim 1, wherein the plurality of extension members define a plurality of spaced apart open channels.

3. The adapter block assembly of claim 2, wherein the plurality of extension members lie within the same plane.

4. The adapter block assembly of claim 2, wherein at least one of the extension members lies within a different plane from which other extension members lie.

5. The adapter block assembly of claim 4, wherein one of the extension members defines a z-shaped cross-sectional profile.

6. The adapter block assembly of claim 2, wherein each opening is configured to retain at least five of the adapters.

7. The adapter block assembly of claim 1, wherein the support structure includes a plurality of extension members extending from a base to define an opening, wherein the adapters are disposed within the opening to form a single column array of adapters.

8. The adapter block assembly of claim 1, wherein the support structure includes a plurality of extension members extending from a base to define an opening, wherein a plurality of adapters are disposed within each opening to form a multiple row and column array of adapters.

9. An adapter block assembly comprising:
a plurality of adapters including:
a housing having opposing top and bottom sides defining a first height and having opposing first and second sidewalls defining a first width, the housing extending between a first end and a second end, wherein the housing includes at least one port for receiving a fiber optic connector;
a slot structure defined with the housing, the slot structure including a first slot segment extending along the first sidewall and a second slot segment extending along the second sidewall;
a first connector having a pair of legs and a base extending between the legs, the pair of legs being removably received into the first and second slot segments of the slot structures of two adjacent adapters.

10. The adapter block assembly of claim 9, further including a second connector having a pair of legs and a base extending between the legs, wherein at least two legs of each of the first and second connectors extend into the a slot structure of an adapter.

11. The adapter block assembly of claim 10, wherein the at least two legs of the first and second connectors form a snap-fit connection with each other.

12. The adapter block assembly of claim 11, wherein at least a portion of the legs that are snap-fit together are overlapping within the slot structure.

13. A fiber optic adapter assembly comprising:
a housing having opposing top and bottom sides defining a first height and having opposing first and second sidewalls defining a first width, the housing extending between a first end and a second end, wherein the housing includes at least one port for receiving a fiber optic connector;
a slot structure defined with the housing, the slot structure extending along at least one of the bottom side, the first sidewall, and the second sidewall, wherein the slot structure contiguously extends across each of the bottom side, the first sidewall, and the second sidewall of the housing;
a flange clip removably inserted into the slot structure, the flange clip having a second width that is greater than first width.

14. The fiber optic adapter assembly of claim 13, wherein the slot structure and the flange are secured to each other via a snap-fit connection.

15. The fiber optic adapter assembly of claim 14, wherein the snap-fit connection includes at least one recessed notch located within the slot structure and at least one corresponding protrusion located on the flange.

16. The fiber optic adapter assembly of claim 13, further comprising:
a panel clip mounted onto the housing.

17. The fiber optic adapter assembly of claim 16, wherein the housing is provided with a recessed area for receiving the panel clip.

18. The fiber optic adapter assembly of claim 17, wherein the panel clip includes a pair of clip portions that extend towards the flange clip.

* * * * *

UNITED STATES PATENT AND TRADEMARK OFFICE
CERTIFICATE OF CORRECTION

PATENT NO. : 10,598,867 B2
APPLICATION NO. : 15/775809
DATED : March 24, 2020
INVENTOR(S) : Danny Willy August Verheyden It is certified that error appears in the above-identified patent and that said Letters Patent is hereby corrected as shown below:

In the Claims

Column 12, Line 19, Claim 10:
"into the a slot"
Should read:
--into the slot--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*